United States Patent
Oehm et al.

(10) Patent No.: US 9,993,967 B2
(45) Date of Patent: Jun. 12, 2018

(54) METHOD FOR JOINING A SEALING SEAM OF A TUBULAR BAG PACKAGING BY MEANS OF AN ULTRASOUND APPLICATOR AND LONGITUDINAL SEAL JOINING DEVICE FOR USE WITH SAID METHOD

(71) Applicant: Robert Bosch GmbH, Stuttgart (DE)

(72) Inventors: Lukas Oehm, Dresden (DE); Ulrich Wieduwilt, Schwaebisch Gmuend (DE); Marko Liebler, Bretten (DE); Sascha Bach, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 14/901,264

(22) PCT Filed: Jun. 11, 2014

(86) PCT No.: PCT/EP2014/062113
§ 371 (c)(1),
(2) Date: Dec. 28, 2015

(87) PCT Pub. No.: WO2014/206732
PCT Pub. Date: Dec. 31, 2014

(65) Prior Publication Data
US 2016/0368200 A1    Dec. 22, 2016

(30) Foreign Application Priority Data

Jun. 28, 2013 (DE) .................. 10 2013 212 697

(51) Int. Cl.
*B32B 37/00* (2006.01)
*B29C 65/08* (2006.01)
(Continued)

(52) U.S. Cl.
CPC ............ *B29C 65/08* (2013.01); *B06B 1/0207* (2013.01); *B06B 3/00* (2013.01); *B29C 65/7891* (2013.01);
(Continued)

(58) Field of Classification Search
CPC ..... B29C 65/08; B29C 65/087; B29C 65/745; B29C 65/7451; B29C 66/1122;
(Continued)

(56) References Cited

U.S. PATENT DOCUMENTS 3,518,136 A     6/1970 Eiji et al.
4,071,385 A *   1/1978 Kuris ................. B44C 1/26
                                                156/154
(Continued)

FOREIGN PATENT DOCUMENTS

DE        1704204       3/1972
DE        10252948      5/2003
(Continued)

OTHER PUBLICATIONS

International Search Report for Application No. PCT/EP2014/062113 dated Aug. 26, 2014 (English Translation, 3 pages).

*Primary Examiner* — James Sells
(74) *Attorney, Agent, or Firm* — Michael Best & Friedrich LLP

(57) ABSTRACT

The invention relates to a method for joining a sealing seam of a tubular bag packaging by means of an ultrasonic applicator (10), characterized in that said ultrasonic applicator (10) generates ultrasonic waves at a frequency of between 0.1 MHz and 5 MHz, preferably between 0.5 MHz and 2 MHz. The invention also relates to a longitudinal seal joining device of a tubular bag machine for use with said claimed method.

12 Claims, 11 Drawing Sheets

(51) Int. Cl.

| | |
|---|---|
| *B29C 65/00* | (2006.01) |
| *B65B 51/22* | (2006.01) |
| *B65B 51/26* | (2006.01) |
| *B06B 1/02* | (2006.01) |
| *B06B 3/00* | (2006.01) |
| *B29C 65/78* | (2006.01) |
| *B29L 23/00* | (2006.01) |

(52) U.S. Cl.
CPC ........ *B29C 65/7894* (2013.01); *B29C 66/112* (2013.01); *B29C 66/133* (2013.01); *B29C 66/135* (2013.01); *B29C 66/4312* (2013.01); *B29C 66/4322* (2013.01); *B29C 66/49* (2013.01); *B29C 66/73921* (2013.01); *B29C 66/81417* (2013.01); *B29C 66/81419* (2013.01); *B29C 66/81429* (2013.01); *B29C 66/836* (2013.01); *B29C 66/83513* (2013.01); *B29C 66/849* (2013.01); *B29C 66/9513* (2013.01); *B65B 51/225* (2013.01); *B65B 51/26* (2013.01); *B06B 2201/72* (2013.01); *B29C 66/1122* (2013.01); *B29C 66/81422* (2013.01); *B29C 66/8432* (2013.01); *B29C 66/9517* (2013.01); *B29L 2023/00* (2013.01); *B65B 2220/08* (2013.01)

(58) Field of Classification Search
CPC . B29C 66/4312; B29C 66/43121; B06B 1/06; B06B 1/0207; B06B 3/00; B54B 51/225; B65B 51/26; B65B 51/306
USPC ........ 156/73.1, 73.3, 515, 530, 580.1, 580.2
See application file for complete search history.

(56) References Cited

U.S. PATENT DOCUMENTS

| | | |
|---|---|---|
| 5,345,747 A | 9/1994 | Raque et al. |
| 2002/0166617 A1* | 11/2002 | Molander ......... A61F 13/15585 |
| | | 156/73.1 |
| 2002/0189206 A1* | 12/2002 | Capodieci ............ B29C 65/086 |
| | | 53/450 |
| 2005/0016690 A1 | 1/2005 | Gmeiner |

FOREIGN PATENT DOCUMENTS

| | | |
|---|---|---|
| DE | 10347015 | 4/2005 |
| DE | 102008044370 | 6/2010 |
| NL | 6603624 | 9/1966 |
| WO | 2007070100 | 6/2007 |
| WO | 2008059352 | 5/2008 |

* cited by examiner

METHOD FOR JOINING A SEALING SEAM OF A TUBULAR BAG PACKAGING BY MEANS OF AN ULTRASOUND APPLICATOR AND LONGITUDINAL SEAL JOINING DEVICE FOR USE WITH SAID METHOD

BACKGROUND OF THE INVENTION

The present invention relates to a method for joining a longitudinal seam of a flexible packaging and particularly to a method for joining a sealing seam of a tubular bag packaging by means of an ultrasonic applicator. The invention also relates to a longitudinal seal joining device of a tubular bag machine for use with the method.

Methods are already known in which join connections on packagings are produced on horizontal and vertical tubular bag machines by means of conventional ultrasound in the range of 20 to 40 kHz.

After forming the packaging material on the forming shoulder, the film is joined to a packaging material tube by means of the longitudinal seam. After feeding the product, the transverse seams are sealed, the product feed can, however, also take place already during the formation of the tube. The packaging material tube is subsequently divided into individual tubular bags by means of a cutting function.

In the known methods, conventional ultrasonic systems consist of a converter, an optional booster and a sonotrode. The vibration generated in the converter by means of the inverse piezoelectric effect is intensified in the booster and directed into the packaging material via the sonotrode. A standing wave is formed in the resonantly vibrating overall system (FIG. 12). The tools, in particular the sonotrode, must be designed as $\lambda/2$ transducers and therefore are subject to geometrical restrictions (FIG. 13). These functional constraints mean that the application on the tubular bag machine has to be oriented to the operating principle of the sonotrode and not to the dimensions of the packaging. The production of the sonotrodes has proven to be complicated and expensive. This is also a reason why this expensive technology is used in the market only for special applications.

The heat generation in the packaging material is based on inner friction and boundary surface friction. In order to fuse the packaging material, a high contact pressure (>200 N) is therefore necessary between sonotrode and packaging material.

The induction of sound into the joining zone generally occurs perpendicularly to the joining surface. A precondition for the heat generation is the use of an energy director as a counterpart to the sonotrode, said energy director defining the working zone of the tool system.

Due to the aforementioned standing wave in the oscillation system, fastening options for the sonotrode are only possible at the nodal points of vibration, where said sonotrode has a zone of the smallest expansion. In this so-called zero line, vibrations should hardly be present. A connection of the sonotrode to corresponding machine elements outside of nodal points of vibration generally leads to a severance and destruction of the coupling point due to the extremely high acceleration forces.

According to the patent publication DT 1704204 A, a method for joining plastic parts based on focused ultrasound is furthermore known. The ultrasonic waves at a frequency of over 100 kHz generated by a vibrator are bundled by means of the vibrator geometry or a focusing assembly and transmitted through a liquid medium. The sound waves directed through the liquid medium excite a membrane into vibration which is pressed onto the plastic parts to be welded.

In addition, the German patent publication DE 10 2008 044 370 A1 describes a device and a method for connecting components by means of focused ultrasound. In this case, the wave guide is formed either by a conical element produced from a metallic solid material or from a liquid- or gel-filled membrane.

SUMMARY OF THE INVENTION

The present invention therefore relates to a method for joining a sealing seam of a tubular bag packaging by means of an ultrasonic applicator, wherein the ultrasonic applicator generates ultrasonic waves in a frequency range of 0.1 MHz to 5 MHz, preferably from 0.5 MHz to 2 MHz. A frequency range of 0.1 MHz to 5 MHz, preferably 0.5 MHz to 2 MHz, is used with the ultrasonic joining method for flexible thermoplastic packaging materials. A progressive wave field forms in the sound conductor. A significant advantage is that the sound conductor does not have to be resonantly designed. There are practically no restrictions with regard to the design thereof as is known from conventional ultrasound. That means that the effective area of the ultrasonic application can be optimally adapted to the geometry to be joined, in this case to the sealing seam. A focusing of the sound waves is achieved by means of the focusing assemblies according to the invention (lens, geometry of the ultrasonic transducer). The sound conductor is significantly more compact in comparison to the geometrical expansion of the conventional sonotrode and is not set into resonance vibrations. This feature makes it possible to create smaller assemblies and significantly reduces the manufacturing costs. According to the invention, the ultrasonic applicator can furthermore be fixed at any arbitrary location. The fixation of said ultrasonic applicator can occur in close proximity to the joining location. As a result, this variant described is significantly more rigid than is possible with a fixation at the nodal point of vibration. According to the invention, the sound does not have to be induced perpendicularly into the joining zone (as is the case with conventional ultrasound) but can be induced into said zone in any direction. The noise emissions when using conventional methods are problematic due to the vibrational response of the overall structure or the stimulation of subharmonics and can lead to irreparable damage to hearing. The device according to the invention is practically noiseless in comparison to conventional ultrasonic methods. This is due to the fact that a vibrational response does not occur in the audible frequency range, and the high frequencies in the air as well as in the machine components can be very quickly damped and cannot spread over greater distances. Conventional ultrasonic systems reverberate approximately 350 ms after switching off the energy supply. This represents a potential danger spot for the user because an immediate stoppage of the resonant unit does not occur, even in the case of an emergency shutdown. If, on the contrary, the generator is switched off in the present invention, the release of energy in the form of sound waves or mechanical vibrations is stopped immediately and without delay.

The invention further relates to a longitudinal seal joining device of a tubular bag packaging machine, in which the inventive method described above comes into use. The longitudinal seal joining device comprises an ultrasonic applicator which generates a frequency between 0.1 MHz and 5 MHz, preferably between 0.5 MHz and 2 MHz.

In a particularly favorable modification to the invention, provision is made for the ultrasonic waves to be introduced in a focused manner into the region of the sealing seam. An energy director in the form of a vibrationally rigid anvil, as in conventional ultrasound, is not necessary. In order to induce sound into the packaging material and therefore cause said material to melt, only the contact of sound conductor to packaging material is necessary. An increased contact pressure, which is required in conventional ultrasound, is not necessary.

According to the invention, provision is furthermore made for the joining region to be designed as a fin seam or an overlapping seam. Because the ultrasonic waves are focused onto the region of the sealing seam in the inventive method, it is not required to provide counter holders or something similar. Thus, the joining regions can be designed in any manner.

Provision is furthermore made according to the invention for the joining region to be supported by a forming tube or a forming shoe. This leads to a stabilization of the joining region and ensures a reliable coupling of the ultrasonic waves.

The amplitude of the sound conductor tip (sealing surface) is maximally only a few micrometers, which leads to a significantly smaller packaging material stress in comparison to the large amplitudes of the conventional ultrasound (12-40 μm). In the case of conventional sonotrodes, the amplitude distribution can fluctuate considerably. This disadvantage cannot be ascertained on the sound conductor tip of the applicator according to the invention.

In order to optimally apply the method, the ultrasonic applicator of the device according to the invention is designed in such a way that said applicator comprises a focusing assembly and a sound conductor adjacent to the ultrasonic transducer. In a preferred manner, attachment means are provided on the sound conductor for attaching the ultrasonic applicator.

Provision is made in a preferred modification to the invention for the ultrasonic applicator to comprise an ultrasonic transducer for the vibration generation, a focusing assembly and a sound conductor. As a result, it is possible to design and to dimension the ultrasonic applicator corresponding to the respective constructional requirements. The ultrasonic energy is precisely brought into the joining region by means of the focusing assembly and the sound conductor. A focusing of the sound waves is achieved by the focusing assemblies (lens, geometry of the ceramics). The sound conductor is thus substantially more compact in comparison to the geometric expansion of the conventional sonotrode and is not set into resonant vibration. This characteristic allows smaller assemblies to be created and substantially reduces the manufacturing costs.

BRIEF DESCRIPTION OF THE DRAWINGS

Exemplary embodiments of the invention are described below in detail with reference to the accompanying drawings. In the drawings.

DETAILED DESCRIPTION

According to the invention, the joining of flexible thermoplastic packaging materials by means of ultrasound in the range of 0.1 MHz to 5 MHz, preferably in the range of 0.5 MHz to 2 MHz, takes place on horizontal and vertical tubular bag machines (HFFS machines and VFFS machines). In the case of conventional ultrasound, in order for the vibrations to have an effect on the packaging material, a correspondingly high counter force is necessary in order that the sonotrode does not come loose and can mechanically act on the packaging material. In addition, the anvil requires an energy director in order to accelerate the fusion of the thermoplastic layers.

The inventive joining device using an ultrasonic applicator 10 generates an amplitude of, e.g., only 1-2 μm at the sound conductor at a frequency of, e.g., 1 MHz.

Figure 18:
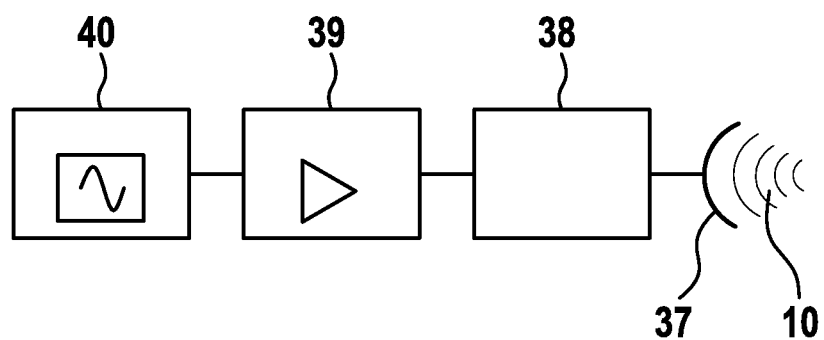
FIG. 18 shows a block diagram of the electrical actuation.

The ultransonic transducer 10*a* consists of a piezoelectric material which deforms on the basis of the inverse piezoelectric effect when an electrical voltage is applied thereto. If an AC voltage is applied to the ultrasonic transducer 10*a*, said transducer generates a vibration. The ultrasonic transducer 10*a* is designed such that the frequency of the applied AC voltage leads to a thickness oscillation of the ultrasonic transducer 10*a*. As schematically depicted in FIG. 18, a signal generator 40, a power amplifier 39, an output matching 38 and the ceramics 37 of the ultrasonic applicator 10 are provided. A frequency generator is used as the signal generator 40, said frequency generator transforming the network voltage to the effective frequency and holding this frequency constant. The ceramics 37 converts the electrical oscillations into mechanical ultrasonic waves of corresponding frequency. The ceramics 37 or, respectively, the ultrasonic transducer 10*a* is coupled to the sound conductor 10*b*, for example adhesively bonded. In order to induce sound into the packaging material 41 and therefore to fuse the same, the contact of sound conductor 10*b* to packaging material 41 is all that is necessary.

Figure 1:
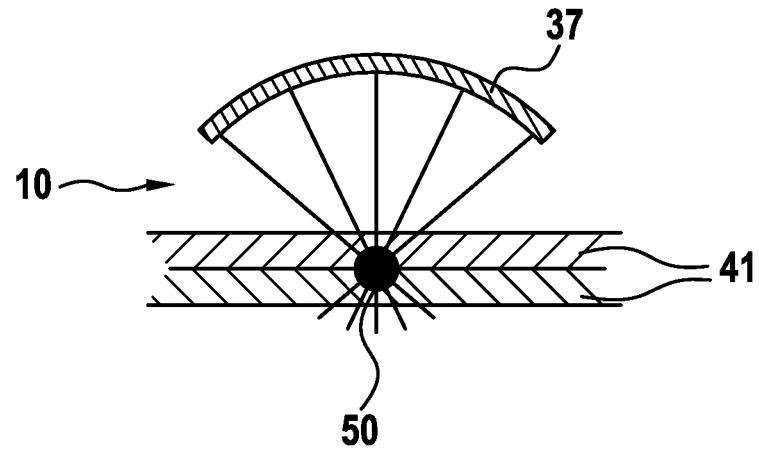
FIG. 1 shows a schematic depiction of the functionality of the ultrasonic applicator according to the invention.

This very small amplitude does not generate any packaging material stress and therefore does not damage the packaging material during the joining process. The energy input (FIG. 1) into the packaging material 41 to be joined takes place by means of a thermal spot 50, for example in the focus zone of the ceramics 37, virtually directly in the joining zone and not by means of hammering movements of the sonotrode in the direction of the packaging material 41. An ultrasonic transducer 10a consists substantially of a ceramics 37 comprising terminals for the high-frequency electrical voltage. The frequency of this voltage lies in the range of 0.1 MHz to 5 MHz, preferably in the range of 0.5 MHz to 2 MHz. The ceramics 37 is fixedly connected to the sound conductor 10b by means of a joining connection capable of being coupled. The voltage is generated by the components shown in FIG. 18.

Figure 2:
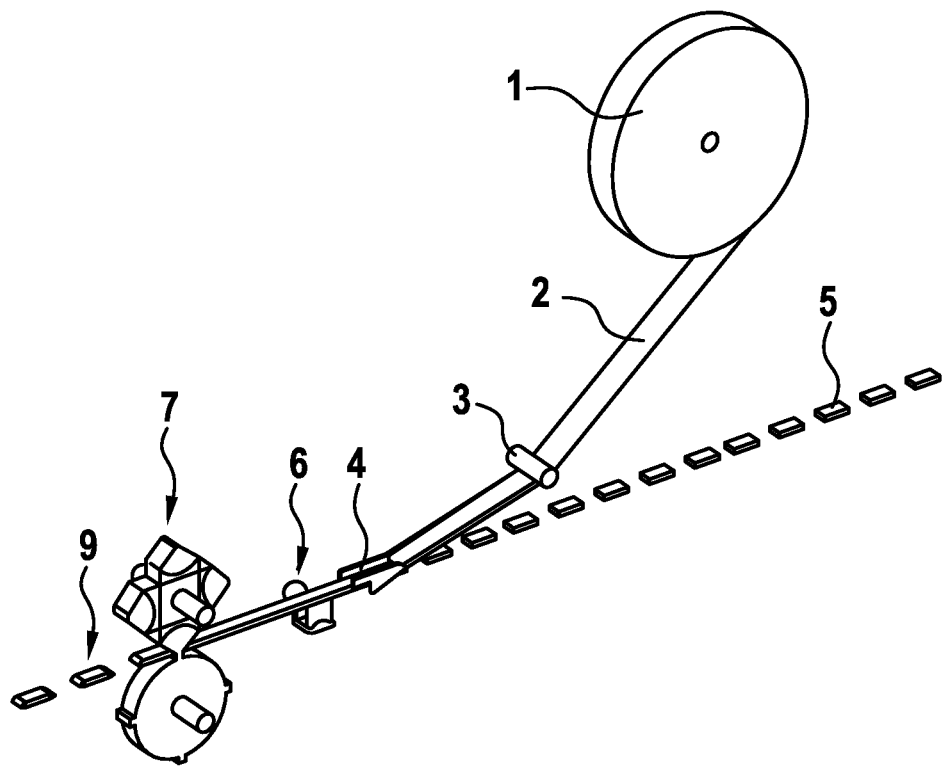
FIG. 2 shows a schematic depiction of the functionality and application of the method according to the invention.
Figure 3:
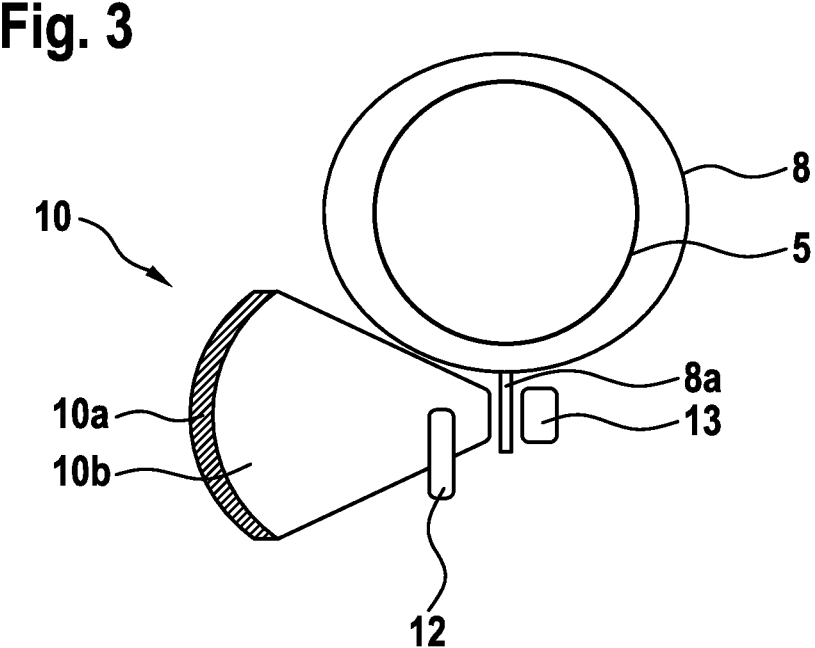
FIG. 3 shows a schematic depiction of the design of a fin seam.

The functionality and application of the inventive joining device for the longitudinal and transverse seam on an HFFS machine is depicted in FIG. 2. A packaging material web 2 is led from a packaging material roll 1 across a guide roller 3 and a forming shoe 4 to a packaging material tube 8. A fin or overlap seam is subsequently joined with a longitudinal sealing device 6 in accordance with FIG. 3 and FIG. 4. The products 5 are, after said products have been fed from the product chain to the packaging material tube 8, transported further by means of friction between product and packaging material to a transverse sealing point 7 comprising a separation function. The transverse sealing device 7 joins the two transverse sealing seams of the tubular bag and also carries out the singling function 9 by means of a separating operation between sealing operations. In FIG. 3, the sealing device for a fin seal 8a is depicted in detail. The existing fin guide or a guide plate 13 is sufficient for fixing the longitudinal seam on the tubular bag during the sealing process. The highly precise setting of the sealing gap, as is known in conventional ultrasonic technology, is not necessary in this method because only a coupling of the sound conductor 10b to the packaging material has to occur.

The joining device according to the invention has an attachment 12 or collar shown in this exemplary embodiment (FIG. 3), which enables a fixation which is variable about an angle of 180°. This advantage simplifies the installation of the joining device in a tubular bag machine. A conventional sonotrode known from the prior art can only be fixed to the attachment options provided at the nodal point of vibration, which is explained below with the aid of FIGS. 12 to 14.

Figure 4:
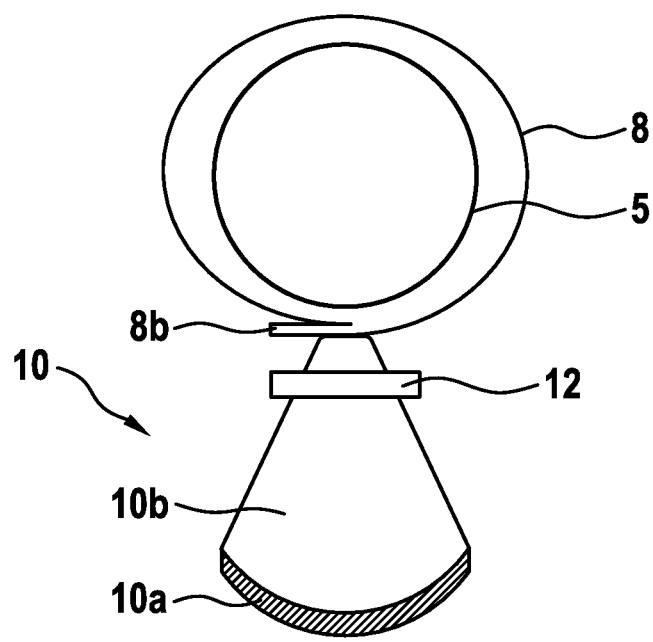
FIG. 4 shows a schematic depiction, analogous to FIG. 3, of the design of a folded-over fin seam.

Analogous to FIG. 3, an exemplary embodiment is shown in FIG. 4, in which the longitudinal seam can also be sealed as a folded-over fin seam or overlap seam.

In FIGS. 3 and 4, a product 5 is schematically depicted which is enclosed by a packaging material tube 8. The reference sign 8a represents a fin seam (FIG. 3), whereas the reference sign 8b represents a folded-over fin seal (FIG. 4). The ultrasonic applicator 10 is schematically depicted. The applicator comprises an ultrasonic transducer 10a for generating sound and a sound conductor 10b. The attachment of the ultrasonic applicator 10 is schematically depicted having the reference sign 12 and is subsequently described in detail in connection with FIG. 15. The reference sign 13 represents a guide component or a counter holder for the fin seam 8a. The edges of the packaging material tube 8 are brought into the detection area of the ultrasonic applicator 10 so as to overlap for the described sealing in the MHz range. The ultrasonic transducer is preferably designed in the shape of a spherical calotte or, respectively, preferably has a partially circular cross section as depicted in the figures. The center of which is located approximately at the focal point 50. Accordingly, the sound conductor 10b is preferably designed having a conical cross section or, respectively, as a frustum of a cone comprising an arched base surface. Any rotationally symmetrical shape can in principle be reproduced using this technology. As a result, the focusing of the sound waves onto the focal point 50 is achieved. The ultrasonic transducer 10a preferably comprises, as previously described, a ceramics 37 for mechanically generating vibrations in the inventive frequency range of 0.1 MHz to 5 MHz, preferably in the range of 0.5 MHz to 2 MHz.

Figure 5:
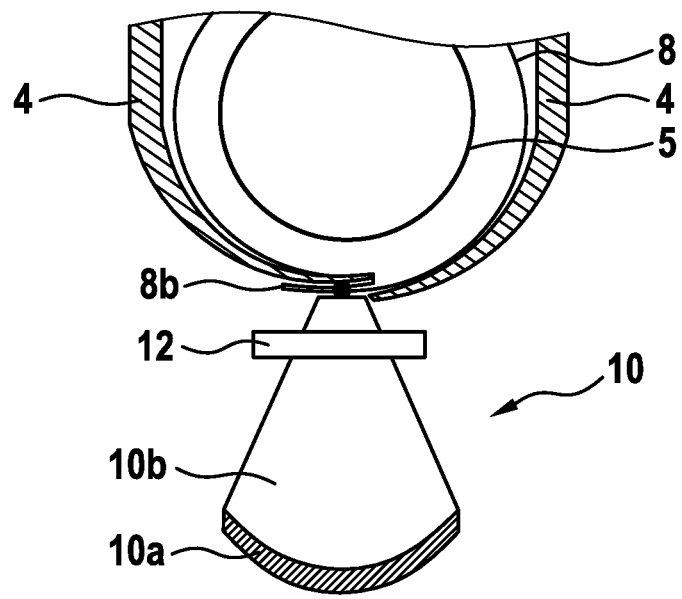
FIG. 5 shows a schematic depiction, analogous to FIG. 4, using a forming tube.
Figure 6:
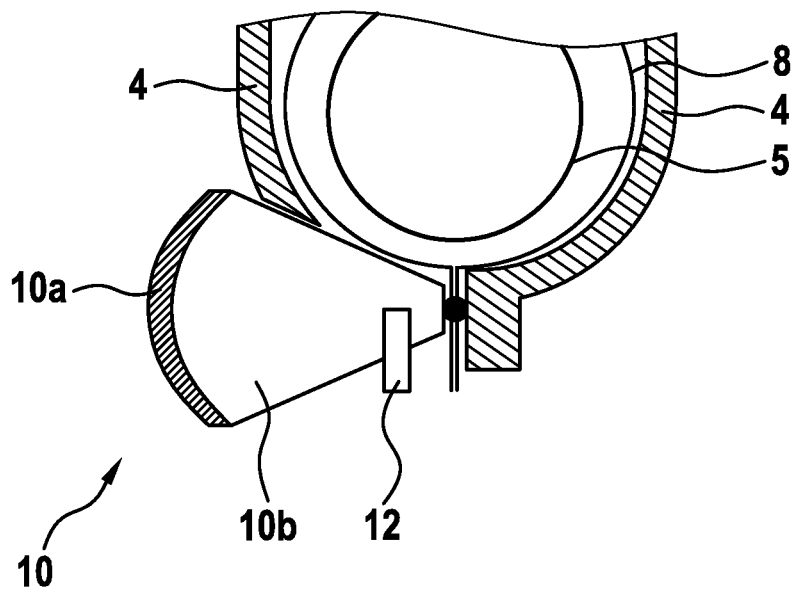
FIG. 6 shows a depiction, analogous to FIGS. 3 and 5, using a forming tube.

The sealing of the overlap seam directly against the forming tube 4 or, respectively, the forming shoe 4 by means of an HFFS machine is depicted in FIGS. 5 and 6. In both cases, the contours of the forming tube/forming shoe 4 are used as a counter holder for the packaging material fixation. The ends of the packaging material tube 8 to be sealed are brought between the ultrasonic applicator 10 and the forming tube 4 respectively the forming shoe 4. To this end, ultrasonic applicator 10 and forming tube 4 respectively forming shoe 4 are disposed so as to be suitably spaced apart from one another. The packaging material tube 8 is moved by relevant transport means, such as a packaging haul-off or something similar, into the effective area of the ultrasonic applicator 10.

In the embodiment according to FIG. 5, the forming tube 4 respectively the forming shoe 4 has a gap, by means of which the two ends of the packaging material are formed to a packaging tube 8, i.e. guided on the outer face of the forming tube 4 respectively forming shoe 4. This outer face acts as a counter holder for the sealing operation. In this connection, the ultrasonic applicator 10 is oriented in the direction of the outer face of the forming tube 4 respectively forming shoe 4.

In the exemplary embodiment according to FIG. 6, the forming tube 4 respectively the forming shoe 4 has a 90° edge, along which the fin seam 8a is guided. The tapered end of the ultrasonic applicator 10 is disposed opposite this leading edge in such a way that the fin seam 8a to be sealed runs between them.

An attachment 12 is provided in the region of the sound conductor 10b for the purpose of holding the ultrasonic applicator 10 relative to the forming tube 4 respectively forming shoe 4.

The method can be integrated in the region of the formation of the packaging material tube in a very cost and space saving manner. This compact embodiment is only possible because the joining method according to the invention does not require a vibration-decoupled anvil and the attachment of the resonant unit can take place directly at the effective working area.

Figure 7:
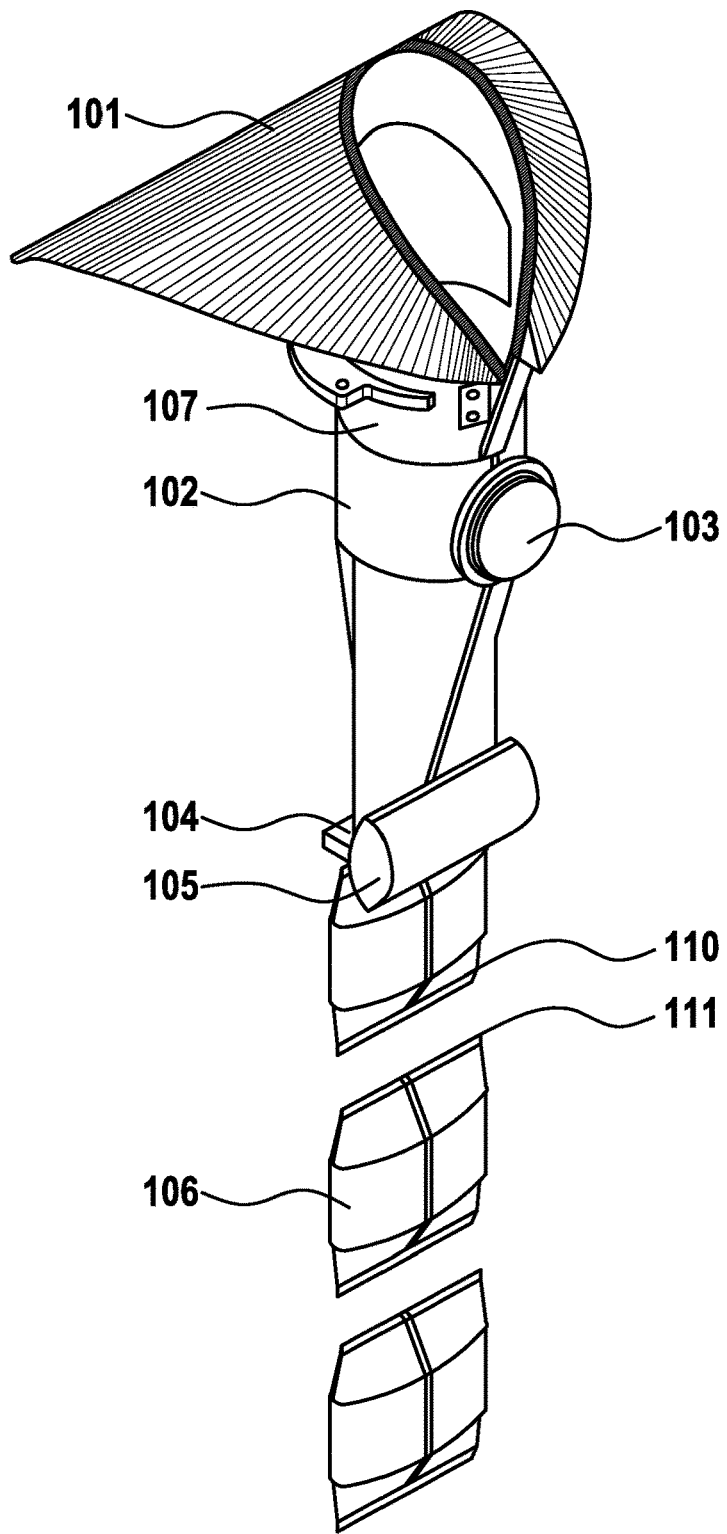
FIG. 7 shows a schematic depiction of the design of a tubular bag packaging.

In the case of VFFS machines, the packaging material web is, like in FIG. 7, likewise formed to a packaging material tube 102 by means of a forming shoulder 101. The downstream longitudinal sealing device 103 joins the overlap or fin seam. Due to the force of gravity, the products are fed into the preformed packaging material tube 102, which is closed with a transverse seam/foot seam 110/111 by means of the transverse sealing tools 104, 105. After the filling operation, the tubular bag 106 is closed on top with a transverse/head seam 110/111 and is subsequently isolated by means of a separating operation.

Figure 8:
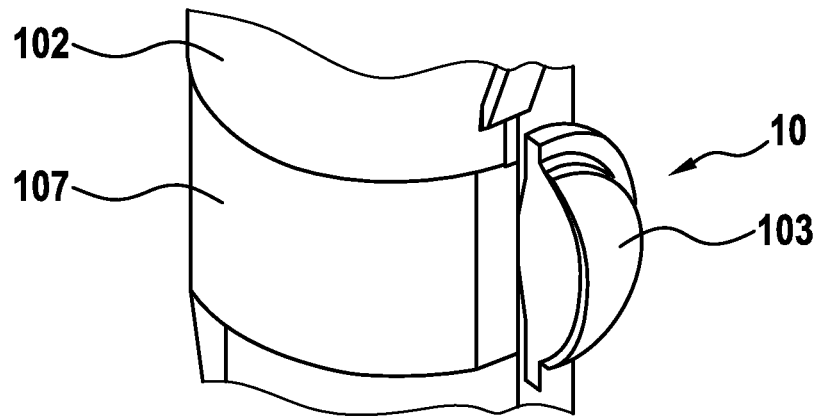
FIGS. 8, 9 show an enlarged partial view of the ultrasonic applicator according to FIG. 7.
Figure 9:
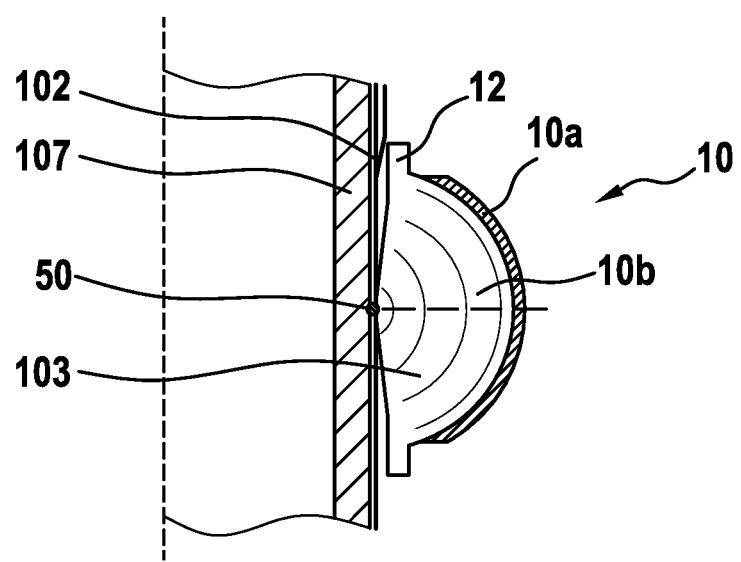
Figure 11:
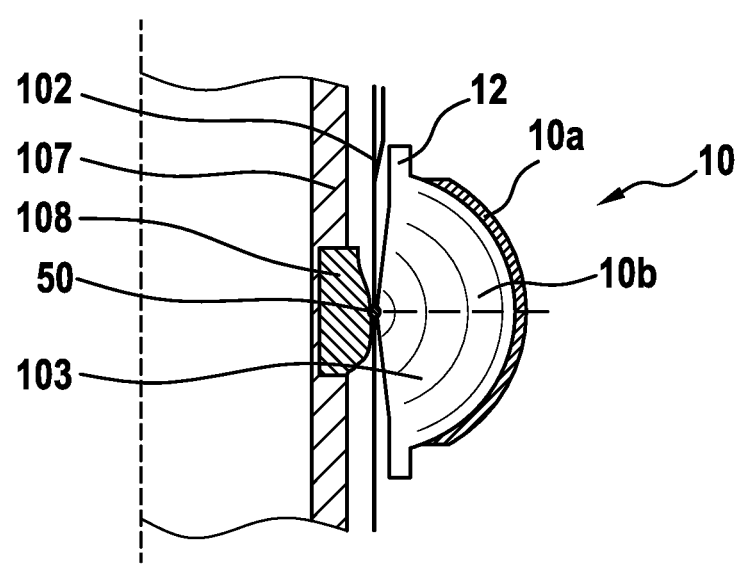

The sealing seam can be sealed directly against a forming tube 107 in the joining process according to the invention (FIGS. 8 and 9). According to the invention, a vibration-decoupled and sound-reflecting anvil comprising an energy director is not required for the joining process comprising the formation of a sealing seam. The ultrasonic applicator 10 as a constituent part of the longitudinal sealing device 103, which is responsible for the energy input, is located directly below the forming shoulder 101, where the film is formed to a packaging tube 102. As a result, the space requirements for the longitudinal sealing operation are reduced and the tubular bag machine can be more compactly designed. The packaging tube 102 formed by the forming shoulder 101 subsequently moves between the forming tube 107 and the ultrasonic applicator 10 of the longitudinal sealing device 103. In the exemplary embodiment according to FIGS. 7 to 9, the ultrasonic applicator 10 has substantially a conical shape. The tip of the ultrasonic applicator 10 is oriented towards the focal point 50 for connecting the two packaging material parts. The ultrasonic transducer 10a has a spherical calotte-shaped surface. In FIGS. 9 and 11, the ultrasonic waves generated by the ultrasonic transducer 10a are depicted in a partially circular manner, as said waves travel through the sound conductor 10b towards the focal point 50. The ultrasonic transducer 10a of the longitudinal sealing device 103 also preferably constitutes an ultrasonic transducer 10a for generating vibrations in the inventive frequency range of 0.1 MHz to 5 MHz, preferably in the range of 0.5 MHz to 2 MHz. The very simple design in accordance with the invention can take place on every tubular bag machine, regardless whether an intermittent or continuous functional principle is in effect. The cross section of the forming tube is therefore likewise rectangular or round, independent of the function of the sealing device.

Figure 10:
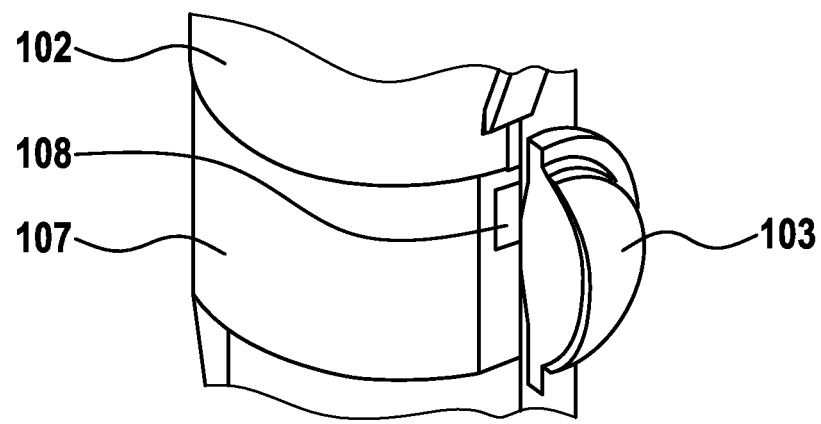
FIGS. 10, 11 show a modified embodiment analogous to FIGS. 8 and 9.

An element 108 for melting distribution can be attached to the forming tube 107 in order to achieve higher web speeds and an optimal sealing seam formation, i.e. with greater sealing seam strengths. This element 108 is depicted having a rectangular shape in FIGS. 10 and 11, can consist of metal or plastic and is fixed on the forming tube 107.

A laminar distribution of the liquid sealing medium in the sealing zone is achieved with this device. The partially liquefied sealing layer is not displaced by the hammering movements related to the method in conventional ultrasound technology, but rather remains in the sealing zone until it is solidified. This significantly increases the strength of the sealing seam.

The ultrasonic applicator 10 according to the invention can be directly attached at the joining location; however, any other attachment options on the sound conductor 10b are also possible.

An anvil comprising an energy director is not required for the formation of the sealing seam. The existing fin guide or a guide component (13 in FIG. 3) is sufficient for fixing the longitudinal seam on the tubular bag during the sealing operation. The highly precise setting of the sealing gap, as is known from the conventional ultrasonic technology, is not necessary in this method because only a coupling of the sound conductor 10b to the packaging material has to be provided.

Figure 12:
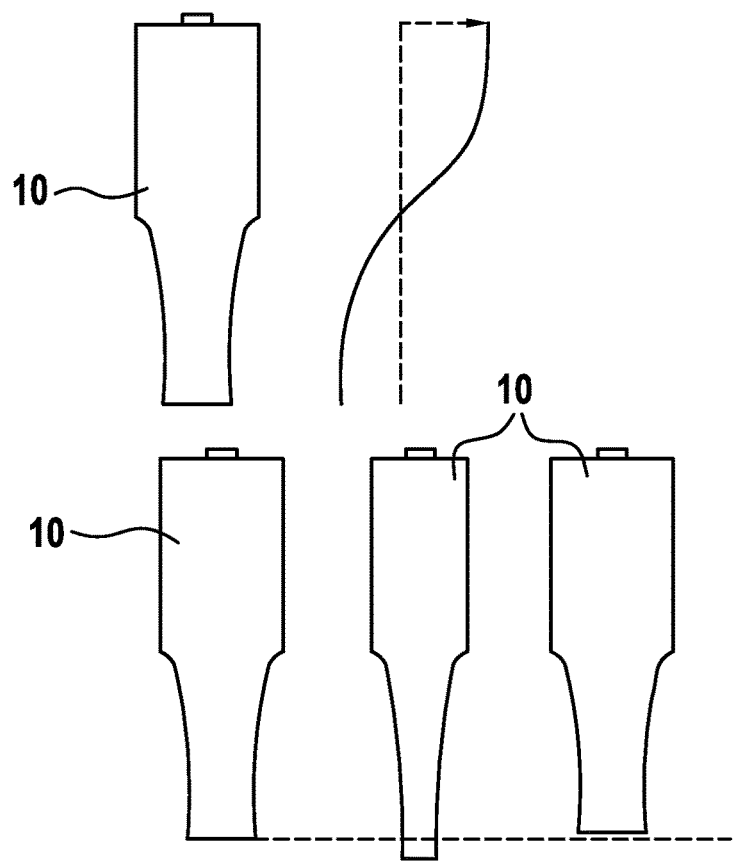
FIG. 12 shows designs of sonotrodes according to the prior art.
Figure 13:
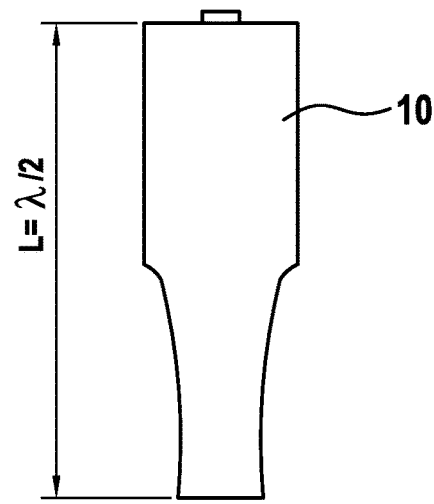
FIG. 13 shows a depiction of the sonotrode according to the prior art.
Figure 14:
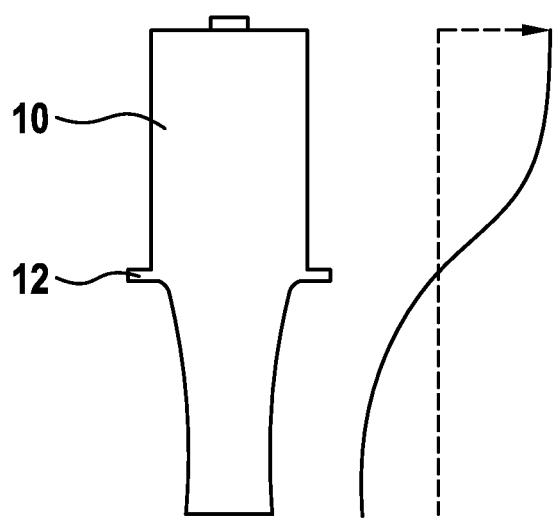
FIG. 14 shows a depiction of a sonotrode according to the prior art comprising an attachment arrangement.

FIGS. 12 to 14 show a sonotrode known from the prior art. Said sonotrode, as depicted in FIG. 13, must have a length of $L=\lambda/2$. A standing wave forms, which is depicted in FIG. 12 in a simplified manner. It can thereby be seen that a zero crossing occurs in the center of the sonotrode (half the length). It is therefore required that the sonotrode be mounted at this location using the attachment means 12.

Figure 15:
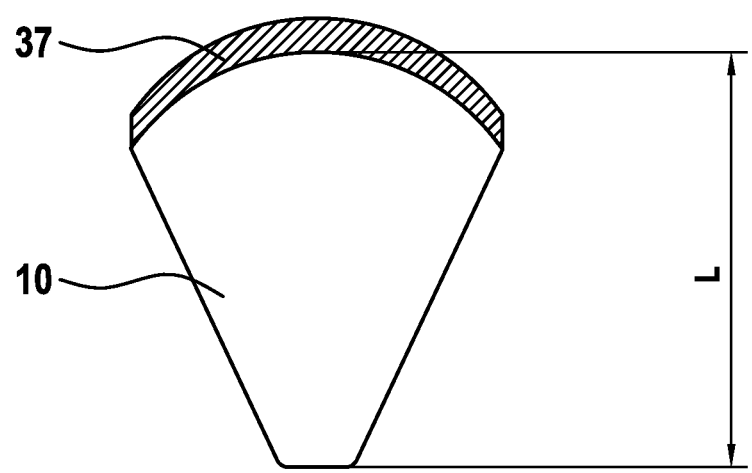
FIG. 15 shows a simplified side view of an ultrasonic applicator according to the invention.
Figure 16:
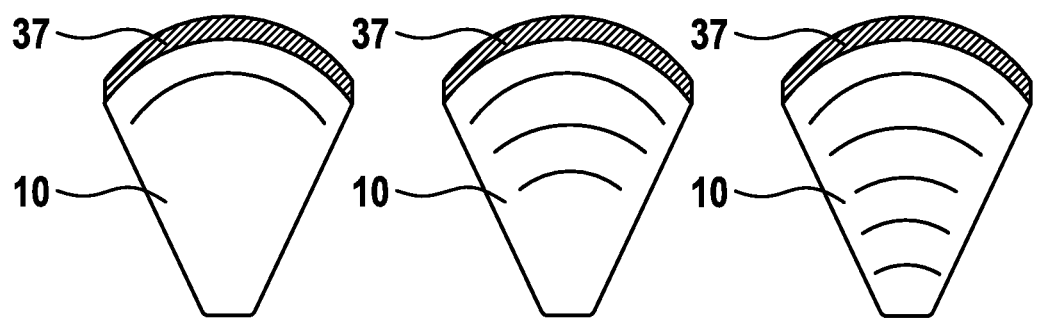
FIG. 16 shows depictions of the sound propagation of an ultrasonic applicator according to the invention.
Figure 17:
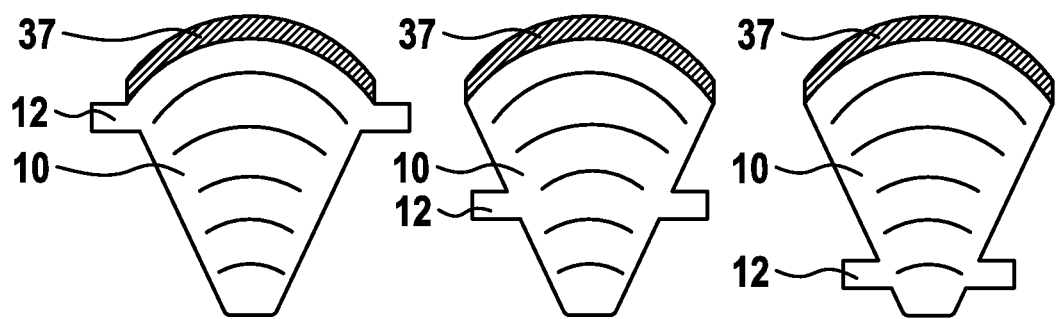
FIG. 17 shows depictions of attachment options for the ultrasonic applicator according to the invention.

FIGS. 15 to 17 show, by way of example, schematic depictions of the ultrasonic applicator 10 according to the invention with the piezoelectric ceramics 37. It can be seen in FIG. 15 that the length L can be designed in an arbitrary manner. FIG. 16 shows propagations of the sound waves (progressive wave field), as these were previously described. FIG. 17 shows different attachment arrangements by means of the attachment means 12. It is clear that the attachment 12 of the ultrasonic applicator 10 has no effect on the functionality of said applicator and can take place in an arbitrary manner.

Figure 19:
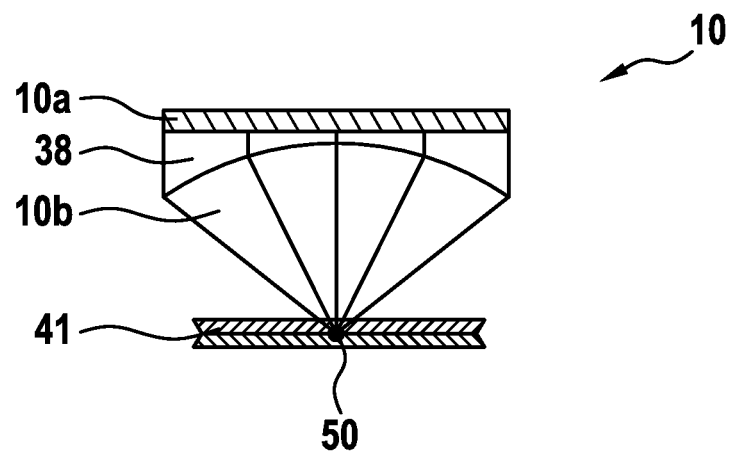
FIG. 19 shows a schematic depiction of a modified configuration.
Figure 20:
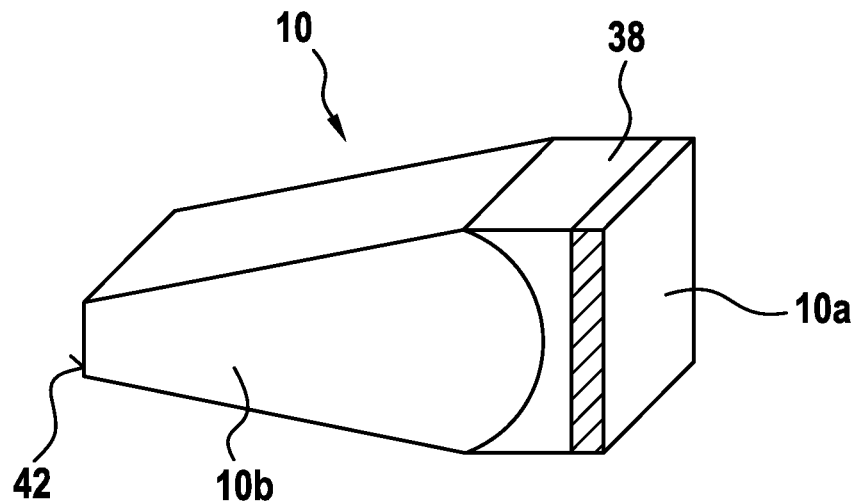
FIG. 20 shows a further modified configuration of the ultrasonic applicator.

FIGS. 19 and 20 show alternative embodiments of the ultrasonic applicator 10. The ultrasonic applicator 10 comprises an ultrasonic transducer 10a, which is now designed in a planar or plate-shaped manner. A focusing assembly 38 is disposed between the particularly plate-shaped ultrasonic applicator 10a and the sound conductor 10b. The focusing assembly is lenticularly designed and bundles the sound waves, which are indicated in a linear fashion, on the basis of the concave configuration thereof onto focal point 50 for the purpose of sealing the two packaging material parts 41 at said focal point. In the exemplary embodiment according to FIG. 19, the sound conductor 10b tapers off at a point or, respectively, tapers off in a substantially rotationally symmetrical manner.

In the exemplary embodiment according to FIG. 20, the sound conductor 10b tapers off in a working face 42. This working face 42 is substantially a planar surface. This planar surface is disposed parallel to the plate-shaped ultrasonic transducer 10a. The focusing assembly 38 is located in turn between the sound conductor 10b and the plate-shaped ultrasonic transducer 10a. The focusing assembly 38 is designed as a planar surface on the side adjacent to the ultrasonic transducer 10a. The focusing assembly 38 is designed partially circular or concave on the side oriented towards the sound conductor 10b.

FIGS. 3 to 11 as well as 19 and 20 particularly show exemplary embodiments of a longitudinal seal joining device according to the invention, which is designed in such a way that the method according to the invention can be used with said embodiments, as was described above.

What is claimed is:

1. A method for joining a sealing seam (8a, 8b) of a tubular bag packaging, the method comprising providing an ultrasonic applicator (10), and joining the sealing seam with the ultrasonic applicator (10), wherein the ultrasonic applicator generates ultrasonic waves at a frequency of between 0.1 MHz and 5 MHz and at an amplitude of 1 μm to 2 μm in a region of the sealing seam (8a, 8b).

2. The method according to claim 1, characterized in that the ultrasonic waves are introduced in a focused manner onto a joining region of the sealing seam (8a, 8b).

3. The method according to claim 1, characterized in that a joining region is a fin seam (8a) or an overlap seam (8b).

4. The method according to claim 1, characterized in that a joining region is supported by a forming tube (4, 107) or by a forming shoe (4).

5. A longitudinal seal joining device of a tubular bag packaging machine comprising an ultrasonic applicator (10) configured to emit ultrasonic waves at a frequency between 0.1 MHz and 5 MHz and at an amplitude of 1 μm to 2 μm in a region of the sealing seam (8a, 8b), and wherein the device comprises at least one forming tube (4, 107) and/or one forming shoe (4), which forming tube or which forming shoe is disposed adjacent to the ultrasonic applicator (10).

6. The device according to claim 5, characterized in that the ultrasonic applicator (10) is configured to emit ultrasonic waves at a frequency between 0.5 MHz and 2 MHz.

7. The device according to claim 5, characterized in that the ultrasonic applicator (10) comprises an ultrasonic transducer (10a) and/or a focusing assembly (38) and/or a sound conductor (10b).

8. The device according to claim 7, characterized in that the sound conductor (10b) is provided with attachment means (12).

9. The device according to claim 7, characterized in that the ultrasonic transducer (10a) is in the shape of a plate or a spherical calotte.

10. The device according to claim 7, characterized in that the focusing assembly (38) is lenticular.

11. The method according to claim 1, wherein the ultrasonic applicator (10) generates ultrasonic waves at a frequency of between 0.5 MHz and 2 MHz.

12. The device according to claim 5, characterized in that said device comprises at least one forming tube (4, 107) and/or one forming shoe (4), which forming tube or which forming shoe is disposed adjacent to the ultrasonic applicator (10) for supporting a packaging material tube (8) to be sealed or, respectively, a sealing seam (8a, 8b).

* * * * *